(12) United States Patent
Cyrek et al.

(10) Patent No.: US 10,828,748 B2
(45) Date of Patent: Nov. 10, 2020

(54) QUALIFYING A COLD WORKING AND POLISHING PROCESS

(71) Applicant: General Electric Company, Schenectady, NY (US)

(72) Inventors: Michal Jerzy Cyrek, Pruszhow (PL); Waldemar Jan Okrzesik, Warsaw (PL); Seweryn Grzegorz Skowronski, Warsaw (PL)

(73) Assignee: General Electric Company, Schenectady, NY (US)

( * ) Notice: Subject to any disclaimer, the term of this patent is extended or adjusted under 35 U.S.C. 154(b) by 336 days.

(21) Appl. No.: 15/869,871

(22) Filed: Jan. 12, 2018

(65) Prior Publication Data
US 2018/0222014 A1    Aug. 9, 2018

(51) Int. Cl.
  *B24C 1/10*       (2006.01)
  *B23Q 17/20*   (2006.01)
  (Continued)

(52) U.S. Cl.
  CPC ............... *B24C 1/10* (2013.01); *B23Q 17/20* (2013.01); *B24C 1/08* (2013.01); *G01B 11/24* (2013.01)

(58) Field of Classification Search
  CPC .. B24C 1/08; B24C 1/10; B23Q 17/20; G01B 11/24
  See application file for complete search history.

(56) References Cited

U.S. PATENT DOCUMENTS 4,530,861 A    7/1985 Sippel et al.
4,995,087 A    2/1991 Rathi et al.
(Continued)

FOREIGN PATENT DOCUMENTS

CN    102565189    7/2012
GB       580101     8/1946
(Continued)

OTHER PUBLICATIONS

GT2005-69132, Proceedings ASME Turbo Expo 2005 International Gas Turbine and Aeroengine Congress Jun. 6-9, 2005 Reno NV, "The Effect of Ultrapolish on a Transonic Axial Rotor".
(Continued)

*Primary Examiner* — Moshe Wilensky
(74) *Attorney, Agent, or Firm* — Hanley, Flight & Zimmerman, LLC

(57) ABSTRACT

A method for determining sufficiency of compressive residual stresses in region below cold worked surface covered by a polished surface. Method includes obtaining surface height data along scanning passes over unpolished surface of the cold worked surface and the polished surface, determining region of surface height data with low and high points, and calculating step height by calculating difference between low and high points. Determining average height of the polished surface and peak height of the unpolished surface for the low and high points respectively. Cold worked surface may be peened surface. Confocal scanning microscope may be used for obtaining surface height data. Method may be used for qualifying a cold working or peening and polishing process for an airfoil which may include at least one feature from group consisting of camber, twist, curve away from the span, and lean away from the span.

16 Claims, 2 Drawing Sheets

(51) Int. Cl.
*B24C 1/08* (2006.01)
*G01B 11/24* (2006.01)

(56) References Cited

U.S. PATENT DOCUMENTS

| | | |
|---|---|---|
| 5,003,805 A | 4/1991 | Thompson |
| 5,172,580 A | 12/1992 | Thompson |
| 5,293,320 A | 3/1994 | Thompson et al. |
| 5,948,293 A | 9/1999 | Somers et al. |
| 6,075,593 A | 6/2000 | Trantow et al. |
| 6,094,260 A | 7/2000 | Rockstroh et al. |
| 6,377,039 B1 | 4/2002 | Goldfine et al. |
| 6,415,044 B1 | 7/2002 | Simpson et al. |
| 6,629,464 B2 | 10/2003 | Suh et al. |
| 6,914,215 B2 | 7/2005 | Davis et al. |
| 7,567,873 B2 | 7/2009 | Kojima et al. |
| 8,024,846 B2 * | 9/2011 | Luna ................ B23P 9/00 29/90.5 |
| 8,468,862 B2 | 6/2013 | Ganesh |
| 2015/0099170 A1 * | 4/2015 | Motoi ................ H01M 4/661 429/217 |

FOREIGN PATENT DOCUMENTS

| | | |
|---|---|---|
| RU | 2267121 | 12/2005 |
| RU | 2007149070 | 6/2009 |
| WO | 2009/024181 | 2/2009 |

OTHER PUBLICATIONS

Wenzel, High Speed Optical Scanning, Optical CMM, Coordinate Measuring Machine, Sep. 20, 2016, http://wenzelamerica.com/products/highspeedopticalscanning/core-optical-cmm.

Patent Office of the Republic of Poland, "Patent Search Report," issued in connection with Polish Patent Application No. P-420430, dated Jun. 22, 2018, 2 pages. (English translation not available).

* cited by examiner

QUALIFYING A COLD WORKING AND POLISHING PROCESS

BACKGROUND OF THE INVENTION

The present invention relates non-destructive evaluation of compressive residual stress layer from peening, and, more particularly, to determining if the compressive residual stress layer is still present in the material after ultra-polishing.

Shot peening is a cold working process by which a surface and immediate underlying substrate regions of a component can be modified to exhibit improved properties, including improved resistance to fatigue and foreign object damage by imparting compressive residual stresses into the substrate regions. Certain components of turbomachinery having airfoils such as gas turbine blades, steam turbine blades, and gas turbine engine compressor and turbine blades formed of steel, titanium-based alloys and superalloys, may require complete shot peening of their airfoil surfaces at relatively high intensities. Shot peening and other cold working processes may cause significant surface roughening of an airfoil surface which can be detrimental to airfoil and blade aerodynamics and overall performance of a turbomachine containing the airfoil. Increased surface roughness also promotes the adhesion of airborne contaminants, corrodents, and erodents whose deposits can promote crevice pitting, stress corrosion cracking and fatigue loss.

In order to reduce roughness following peening, compressor blades often undergo a polishing process, such as prolonged tumbling, hydro-honing, drag finishing, chemical etching, or other methods to reduce the surface finish to more acceptable levels. However, the resulting surface finish is often higher than the original pre-peened airfoil surface finish. Post shot-peen polishing processes can negate the benefits obtained from shot peening by removing some of the compressive residual stress.

Some ultra-polish processes are proprietary processes that require detailed substantiation and qualification of the process. An important item for shot peened parts (like compressor airfoils) is to justify that after material removal by polishing the compressive residual stress layer is still present or the sufficiency of the remaining compressive residual stress layer. One known direct method of evaluation is X-Ray diffraction which is expensive and time consuming. For small stock losses on parts with complicated geometry conventional methods of measurement like back to back Coordinate Measurement Machine (CMM) scanning or coupons are not accurate enough or difficult to interpret.

It is desirable to use an indirect method or an non-destructive evaluation (NDE) to assess stock loss and make sure it is within certain limits. It is desirable to have such a method use a relatively simple, inexpensive, and easy to use machine and method to assess stock loss and make sure it is within certain limits for a cold working or peening and polishing process. It is desirable to have such a method for substantiating and qualifying the cold working or peening and polishing process.

BRIEF DESCRIPTION OF THE INVENTION

A method for determining sufficiency of compressive residual stresses in a region below a cold worked surface covered by a polished surface. The method including: (a) obtaining surface height data along one or more scanning passes over an unpolished surface of the cold worked surface and the polished surface, (b) determining a region of the surface height data with low and high points, and (c) calculating at least one step height by calculating the difference between the low and high points.

The method may include determining an average height of the polished surface and a peak height of the unpolished surface for the low and high points respectively. The cold worked surface may be a peened surface. A confocal scanning microscope may be used for obtaining surface height data.

The method may be used for qualifying a cold working or peening and polishing process by cold working a test piece to form compressive residual stresses in a region below a cold worked surface of the test piece.

The method may also be used for qualifying a cold working or peening and polishing process for an airfoil having pressure and suction sides extending outwardly in a spanwise direction from an airfoil base root to an airfoil tip. The airfoil may include at least one feature selected from a group consisting of camber, twist, curve away from the span, and lean away from the span.

DETAILED DESCRIPTION OF THE INVENTION

Figure 1:
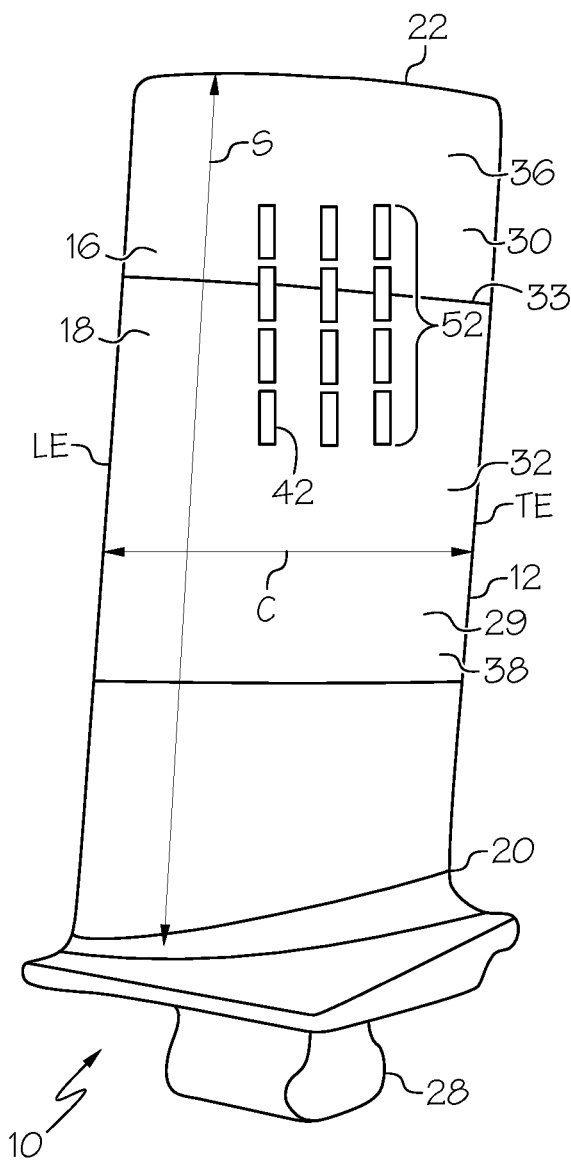
FIG. 1 is a perspective view illustration of an exemplary gas turbine engine blade showing confocal scanning paths of polished and unpolished areas over peened surface.

Illustrated in FIG. 1 is a metallic blade 10 for a gas turbine engine as may be found in a compressor or turbine of the engine. The blade 10 includes an airfoil 12 having pressure and suction sides 16, 18 extending outwardly in a spanwise direction S from an airfoil base root 20 along the span S to an airfoil tip 22. The exemplary blade pressure and suction sides 16, 18 illustrated herein are concave and convex respectively. The airfoil 12 may be cambered and/or twisted about the span S. The airfoil 12 may be curved and/or leaned away from the span S. Possible features of the airfoil including camber, twist, curve and lean away from the span S make the cold working, peening, polishing, and qualifying more difficult and the qualifying method disclosed herein helps overcome these difficulties. The airfoil 12 extends along a chord C between chordwise spaced apart leading and trailing edges LE, TE. The base root 20 includes an integral blade dovetail 28 for mounting the blade 10 to a gas turbine engine rotor disk or drum. The method disclosed herein is illustrated for an airfoil of a blade but it also be used for an airfoil of a vane.

The blade 10 and, particularly, the airfoil 12 is peened and then polished. An exemplary NDE is disclosed herein for substantiating and qualifying a cold working or peening and polishing process using a test piece or blade 10. Peening is one method of cold working used to impart residual compressive stresses and often deep compressive residual stresses into a workpiece illustrated herein as the blade 10. Cold working such as peening produces a region 29 of deep compressive residual stresses extending into the blade 10 from a peened or cold worked surface 30 of the airfoil 12 as indicated by a surface height measurement data line 50 illustrated in FIG. 2.

Shot peening, laser shock peening, and burnishing are examples of cold working processes used on metallic and other hard workpieces. A portion of the peened or cold worked surface 30 is polished forming a polished surface 32 over a portion of the peened or cold worked surface 30. A demarcation line 33 indicates a transition zone 34 extending between an exposed unpolished surface 36 of the cold worked surface 30 and the polished surface 32 over the peened or cold worked surface 30 illustrated in FIG. 1. The peened or cold worked surface 30 is formed first and then the polished surface 38 next. The demarcation line 33 indicates masking such as by taping over a portion of the cold worked surface 30 before polishing.

Figure 2:
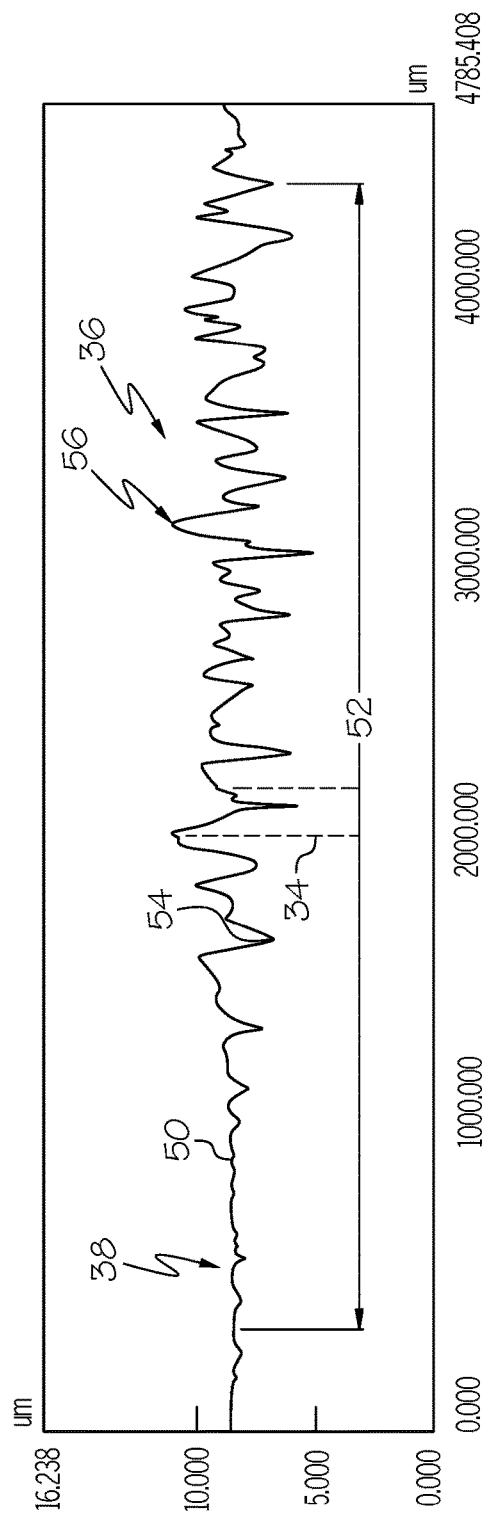
FIG. 2 is a diagrammatic view illustration of surface height measurements from one scan illustrated in FIG. 1.

A stock loss measurement, indicated by the surface height measurement depicted in the data line 50 in FIG. 2, using confocal scanning or another surface measurement device is made along at least one scanning pass or path 42 over the unpolished surface 36 of the cold worked surface 30, the transition zone 34, and then the polished surface 32 illustrated in FIG. 1. After polishing, the tape or mask is removed and a step height 48 between the polished and unpolished surfaces is calculated using a confocal scanning microscope or other applicable measurement device or method to obtain surface height data. This method allows accurate cost effective stock loss measurement on each side of the demarcation line 33 along one or more scanning passes or paths 42.

The exemplary NDE disclosed herein includes scanning the airfoil with laser confocal microscope along scanning paths indicated by dashed lines in FIG. 1 through the exposed unpolished surface 36 of the cold worked surface 30, the polished surface 32 over the peened or cold worked surface 30, and the transition zone 34 therebetween. As a result of the scanning, an operator gets a 2D graphic image of the airfoil surface along the path as illustrated in graphic format in FIG. 2. The data line 50 representing measured surface height in the graph in FIG. 2 represents the airfoil surface height along the path.

Figure 3:
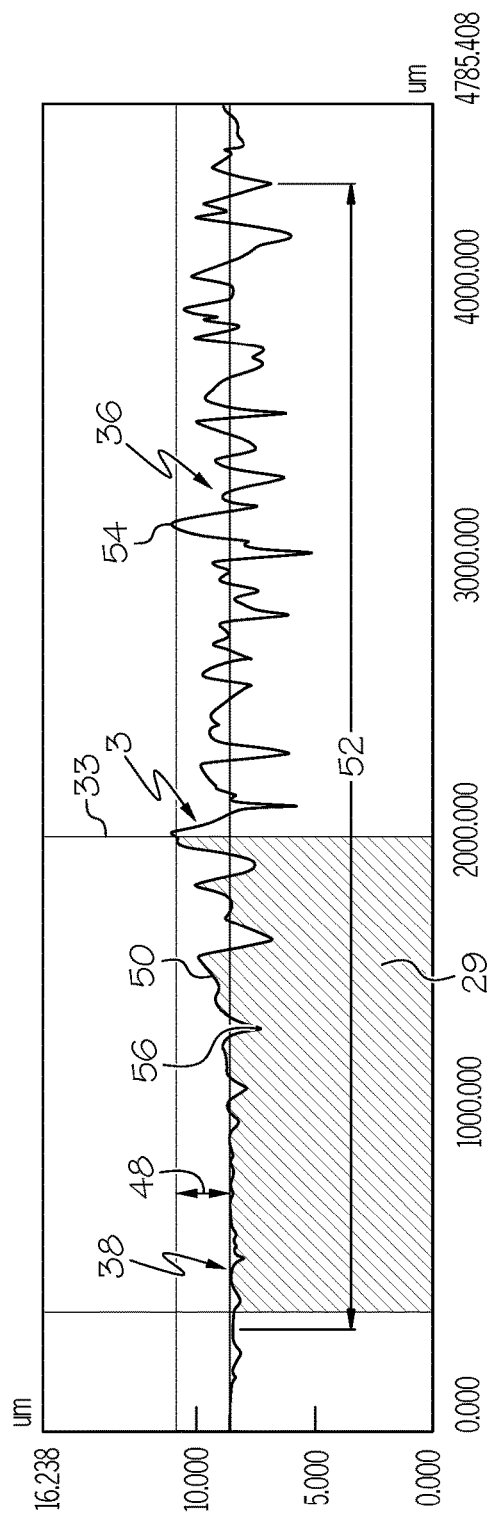
FIG. 3 is a diagrammatic view illustration of average surface heights over the polished and unpolished areas from scan illustrated in FIG. 2.

Referring to FIG. 3, the operator may define or determine a region 52 of measurements or surface height data with low and high points 54, 56. The low point may represent the average height of the polished surface and the high point may represent the peak height of the unpolished surface. A computer program may be used to perform calculations that subtracts the average polished surface height value from the unpolished surface peak height value to determine the step height 48. A plurality of scans may be made along different paths 42 over a single airfoil and a corresponding plurality of step heights 48 may be determined. A simple average or a more complicated statistical function of the plurality of step heights 48 may be used to qualify the cold working or peening and polishing process.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A method for determining sufficiency of compressive residual stresses in a region below a cold worked surface covered by a polished surface, the method comprising:
   (a) obtaining surface height data along one or more scanning passes over an unpolished surface of the cold worked surface and the polished surface,
   (b) determining a region of the surface height data with low and high points, the low and high points used to determine an average height of the polished surface and a peak height of the unpolished surface respectively, and
   (c) calculating at least one step height by calculating a difference between the peak height and the average height.

2. The method as claimed in claim 1 further comprising the cold worked surface being a peened surface.

3. The method as claimed in claim 1 further comprising using a confocal scanning microscope for obtaining surface height data.

4. The method as claimed in claim 3 further comprising the cold worked surface being a peened surface.

5. A method for qualifying a cold working or peening and polishing process, the method comprising:
   (a) cold working a test piece to form compressive residual stresses in a region below a cold worked surface of the test piece,
   (b) polishing a portion of the cold worked surface forming a polished surface over the portion of the cold worked surface,
   (c) obtaining surface height data along one or more scanning passes over an unpolished surface of the cold worked surface and over the polished surface,
   (d) determining a region of the surface height data with low and high points, the low and high points used to determine an average height of the polished surface and a peak height of the unpolished surface respectively, and
   (e) calculating at least one step height by calculating a difference between the peak height and the average height.

6. The method as claimed in claim 5 further comprising the cold worked surface being a peened surface.

7. The method as claimed in claim 5 further comprising using a confocal scanning microscope for obtaining surface height data.

8. The method as claimed in claim 7 further comprising the cold worked surface being a peened surface.

9. A method for qualifying a cold working or peening and polishing process, the method comprising:
   (a) cold working an airfoil having pressure and suction sides extending outwardly in a spanwise direction from an airfoil base root to an airfoil tip,
   (b) cold working the airfoil to form compressive residual stresses in a region below a cold worked surface of the pressure and/or suction sides,
   (c) polishing a portion of the cold worked surface to form a polished surface over the portion of the cold worked surface,
   (d) obtaining surface height data along one or more scanning passes over an unpolished surface of the cold worked surface and over the polished surface,
   (e) determining a region of the surface height data with low and high points, the low and high points used to determine an average height of the polished surface and a peak height of the unpolished surface respectively, and
   (f) calculating at least one step height by calculating a difference between the peak height and the average height.

10. The method as claimed in claim 9 further comprising the cold worked surface being a peened surface.

11. The method as claimed in claim 9 further comprising using a confocal scanning microscope for obtaining surface height data.

12. The method as claimed in claim 11 further comprising the cold worked surface being a peened surface.

13. The method as claimed in claim 9 further comprising the airfoil including at least one feature selected from a group consisting of camber, twist, curve away from the span, and lean away from the span.

14. The method as claimed in claim 13 further comprising the cold worked surface being a peened surface.

15. The method as claimed in claim 13 further comprising using a confocal scanning microscope for obtaining surface height data.

16. The method as claimed in claim 15 further comprising the cold worked surface being a peened surface.

* * * * *